DELTA MODULATION ENCODERS WITH RANDOMIZED IDLE CIRCUIT NOISE

Filed Nov. 17, 1966 2 Sheets-Sheet 1

INVENTOR
S.J. BROLIN
BY R. B. Anderson
ATTORNEY

United States Patent Office 3,516,022

Patented June 2, 1970

3,516,022
DELTA MODULATION ENCODERS WITH RANDOMIZED IDLE CIRCUIT NOISE

Stephen J. Brolin, Bronx, N.Y., assignor to Bell Telephone Laboratories, Incorporated, Murray Hill and Berkeley Heights, N.J., a corporation of New York Filed Nov. 17, 1966, Ser. No. 595,232
Int. Cl. H03k *7/00;* H04b *1/10*
U.S. Cl. 332—11 4 Claims

ABSTRACT OF THE DISCLOSURE

The disclosed circuit is a delta modulator in which an auxiliary low frequency wave is added to the message waveform input to randomize the effective decision level of the delta modulator polarity detector and prevent the generation of audible tones during idle circuit periods. The auxiliary wave is below the range of the message waveform in frequency and has an amplitude which uses up only a minor fraction of the available dynamic range of the delta modulator.

Background of the invention

This invention relates generally to digital message transmittal systems and more particularly to digital message transmission systems which employ the form of differential pulse code modulation known as delta modulation.

In a typical delta modulation system, the message waveform to be transmitted is sampled periodically and positive and negative pulses are applied to integrating circuits at both transmitter and receiver at the sampling rate. In the delta modulator at the transmitter, the output of the integrator is compared with the instantaneous amplitude of the message waveform and the polarity of the difference is detected and used to determine the polarity of the next pulse applied to the integrator. The next pulse is positive, giving the integrator output a positive slope, if the integrator output is smaller than the message waveform and is negative, giving the integrator output a negative slope, if the integrator output is larger than the message waveform. At the same time, a binary digit of one kind is transmitted to the receiver each time the pulse applied to the integrator is positive and a binary digit of the other kind is transmitted each time the pulse is negative. In the delta demodulator at the receiver, the incoming binary digits control the polarity of the locally generated pulses and the original message waveform is reproduced by the integrator and a low-pass filter.

During idle circuit periods in a delta modulation system, if circuit tolerances are not sufficiently close in the delta modulator polarity detector to keep drift of the effective decision point at less than half the size of the pulses applied to the integrator, one or more audible tones are likely to be generated. These tones, although low in level, tend to be annoying to users of the system. It is not always practical, however, to control circuit tolerances sufficiently to prevent generation of such tones.

An object of the present invention is to prevent generation of audible tones during idle circuit periods in a delta modulation system even though there is some drift of the effective decision point of the delta modulator polarity detector.

Another and more particular object of the invention is to prevent the generation of such tones in a delta modulation system in as simple and an inexpensive a manner as possible.

Summary of the invention

In accordance with the invention, the decision point of a delta modulator polarity detector is effectively randomized by the addition of a substantially sinusoidal wave having a freuency below the frequency range of the message waveform and having a rate of change which is a minor fraction of the maximum rate of change capability of the delta modulator. A substantially "white" noise is thereby produced during idle circuit periods which is lower in amplitude and far less bothersome than audible tones. Addition of a wave having a frequency of 60 Hz. is particularly advantageous because of its ready availability at negligible cost.

A more complete understanding of the invention may be obtained from a study of the following detailed description of a specific embodiment.

Detailed description

Figure 1:
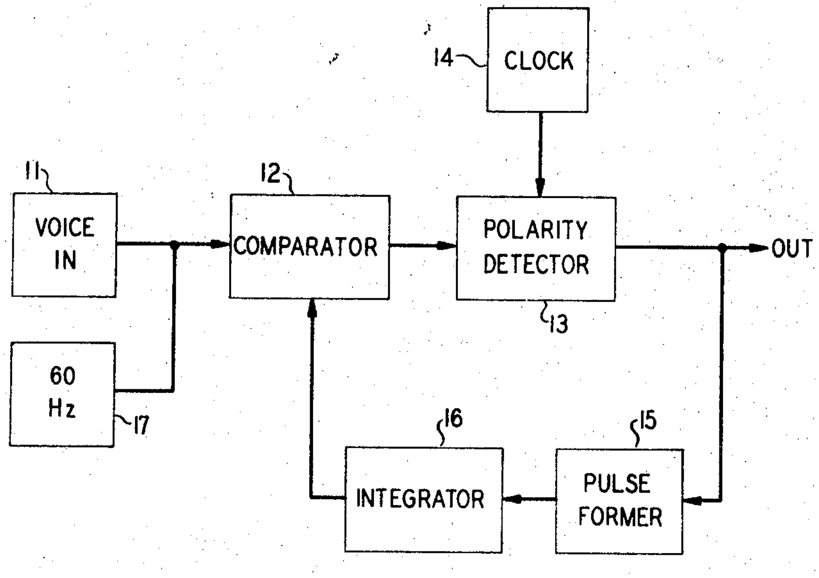
FIG. 1 is a block diagram of a delta modulator embodying the invention.

In the delta modulator illustrated in FIG. 1, a source 11 of a voice frequency message waveform is connected to one input of a comparator 12, which is a two-input circuit delivering an output having the polarity of the difference between its inputs. The output of comparator 12 is supplied to a suitable polarity detector 13 which, under the control of a clock source 14, samples the output of comparator 12 and delivers one or the other of two binary states at its own output, depending upon the polarity of the output of comparator 12. These binary states represent the useful output of the delta modulator and are transmitted out onto the line for delivery to a suitable delta demodulator. At the same time, the output of polarity detector 13 is connected to a pulse-forming circuit 15, which converts one binary state from polarity detector 13 into a positive pulse and the other into a negative pulse. The output of pulse former 15 is supplied to an integrating circuit 16 and the output of integrating circuit 16 is, in turn, supplied to the other input of comparator 12.

The portions of the delta modulator illustrated in FIG. 1 which have been described thus far are conventional. The message waveform supplied from source 11 may, for example, have a maximum bandwidth of from 250 to 3600 Hz., and clock source 14 may supply sampling pulses at a 96.5 kHz. rate. The output of comparator 12 is positive when the instantaneous amplitude of the message waveform is greater than the output of integrator 16 and negative when it is less. Polarity detector 13, in turn, generates binary "1" when the sampled output of comparator 12 is positive and binary "0" when it is negative. These binary indications are, as noted above, transmitted to a suitable delta demodulator for decoding. Simultaneously, pulse former 15 applies a positive impulse to integrator 16 in response to a binary "1" input and a negative impulse in response to a binary "0" input. The output of integrator 16 is thus a saw tooth approximation of the message waveform supplied by source 11.

Figure 2:
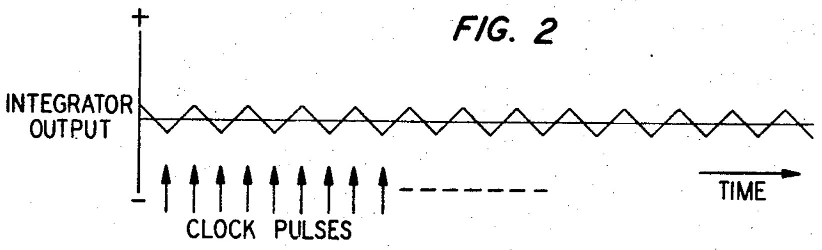
FIG. 2 illustrates the delta modulator integrator output during idle circuit periods for the ideal case of equal positive and negative slopes and negligible polarity detector offset voltage.
Figure 3:
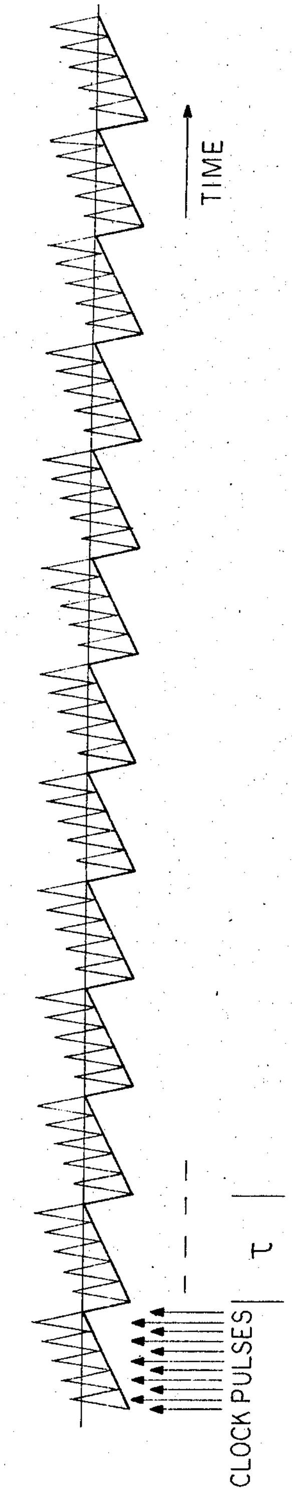
FIG. 3 illustrates on a more compressed scale than that of FIG. 2, a typical delta modulator integrator output during idle circuit periods, absent the present invention, when the decision point of the polarity detector drifts by half the size of the pulses applied to the integrator or more.

In a delta modulator like that illustrated in FIG. 1, the idle circuit mode occurs when there is no input from source 11. FIG. 2 illustrates the output of integrator 16 during idle circuit periods when the decision point of polarity detector 13 is held precisely at zero. Polarity detector 13 generates an alternating binary "1" and binary "0" pattern and the output of integrator 16 averages zero and includes no audible components. As mentioned above, however, it is not always practical to control circuit tolerances sufficiently to hole the decision point of polarity detector 13 precisely at zero and, if the decision point drifts by as much as half the size of the pulses applied to integrator 16, an integrator output like that shown in FIG. 3 results. It can be seen in FIG. 3 that the output of the integrator contains a sawtooth component of period $\tau$. The frequency of this sawtooth component may and often does, fall within the audible range. Thus the integrator output now includes at least one tone which may be audible and fall within the normal frequency range of the message waveform. Such a tone is relatively low in level but can be highly annoying to users of the system.

Figure 4:
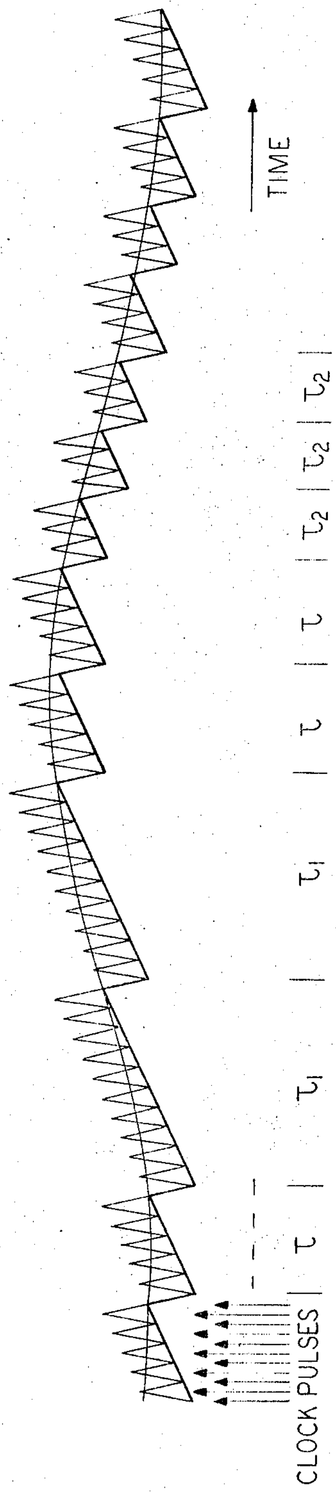
FIG. 4 illustrates the delta modulator output during idle circuit periods in accordance with the present invention.

In the embodiment of the invention illustrated in FIG. 1, the decision point of polarity detector 13 is effectively randomized by the addition of a 60 Hz. sine wave to the message input of comparator 12. This sine wave, shown applied from a local source 17, prevents generation of the audible tones associated with the integrator output shown in FIG. 3 and, at the same time, eliminates an undesirable "threshold" effect associated with the integrator output illustrated in FIG. 2 for low level message waves. The 60 Hz. wave produces instead a fairly "white" noise which is far more desirable than audible tones and which is, furthermore, typically several decibels lower in level than the annoying tones. FIG. 4 illustrates the integrator output with the 60 Hz. wave present. It can be seen that the sawtooth wave of FIG. 3 now is superimposed upon the sinusoidal wave, thereby producing marked variations in the period, or frequency, of the sawtooth. Several different periods, $\tau$, $\tau_1$, $\tau_2$, now exist for the sawtooth wave. Some of these periods, or equivalent frequencies, may fall below the audible range, while others may be above that range. Even if all frequencies represented by the periods fall within the audible range, the net effect is a "white" noise which is less disturbing than a steady tone.

There is reasonable tolerance with respect to the frequency and amplitude of the added sine wave. A frequency of 60 Hz. is generally preferred since it is available at practically no cost and is close to optimal. The frequency should be high enough to create a random effect but low enough to be below the maximum frequency range of the message wave. The amplitude should only be large enough to be effective without using up more than a small fraction of the available dynamic range. In other words, the rate of instantaneous amplitude change contributed by the added 60 Hz. wave should be only a minor fraction of the maximum rate of change capability of the delta modulator. An amplitude which uses something of the order of 5 to 10 percent of the available dynamic range has been found to be particularly effective.

It is to be understood that the above-described arrangement is illustrative of the application of the principles of the invention. Numerous other arrangements may be devised by those skilled in the art without departing from the spirit and scope of the invention.

I claim:

1. A delta modulator for encoding a message waveform occupying a predetermined maximum frequency range which comprises a comparator having an output and a pair of inputs, means to detect the polarity of the output of said comparator at periodic sampling intervals, means to generate a pulse of one polarity whenever the detected polarity is positive and a pulse of the opposite polarity whenever the detected polarity is negative, an integrator connected to receive said pulses, means to supply said message waveform and the output of said integrator to respective inputs of said comparator, a source of a substantially sinusoidal auxiliary wave independent of said message waveform and and having a frequency below said predetermined range, and means to supply said auxiliary wave from said source to one of the inputs of said comparator, whereby the decision level of said polarity detector is randomized sufficiently to prevent generation of tones within said predetermined range during the absence of said message waveform.

2. A delta modulator in accordance with claim 1 in which the amplitude of said auxiliary wave is sufficient to use up only a minor fraction of the available dynamic range of the delta modulator.

3. A delta modulator in accordance with claim 1 in which said auxiliary wave is supplied to the same input of said comparator as said message waveform.

4. A delta modulator in accordance with claim 1 in which said message waveform occupies the voice frequency range and said auxiliary wave has a frequency of substantially 60 Hz.

References Cited

UNITED STATES PATENTS

| | | | |
|---|---|---|---|
| 2,803,702 | 8/1957 | Ville et al. | |
| 2,916,553 | 9/1959 | Crowley | 340—354 |
| 3,048,781 | 8/1962 | Glaser | 325—41 |
| 3,127,554 | 3/1964 | Kaneko. | |
| 3,270,335 | 8/1966 | Hackett. | |
| 3,273,141 | 9/1966 | Hackett. | |

ALFRED L. BRODY, Primary Examiner

U.S. Cl. X.R.

325—38, 41